United States Patent [19]
Lineback et al.

[11] 4,084,123
[45] Apr. 11, 1978

[54] CORDLESS ELECTRIC DEVICES HAVING RECHARGEABLE BATTERY PACK(S)

[75] Inventors: Lynn D. Lineback, Danville, Va.; James E. Edgell, Senatobia, Miss.

[73] Assignee: Disston, Inc., Pittsburgh, Pa.

[21] Appl. No.: 607,376

[22] Filed: Aug. 25, 1975

[51] Int. Cl.² .................... H02J 7/00; H01M 45/00
[52] U.S. Cl. ................................ 320/2; 30/DIG. 1; 310/50
[58] Field of Search .............. 240/10.6, 10.6 CH; 310/50; 320/2-5

[56] References Cited

U.S. PATENT DOCUMENTS

| | | | |
|---|---|---|---|
| 3,728,664 | 4/1973 | Hurst | 320/2 X |
| 3,734,207 | 5/1973 | Fishbein | 310/50 X |
| 3,757,194 | 9/1973 | Weber et al. | 310/50 X |

FOREIGN PATENT DOCUMENTS 1,418,746  10/1965  France ................................ 320/2

OTHER PUBLICATIONS

Operating Manual for "Uher 4000 Report-S" Tape Recorder (portable), p. 2.
"Uher 4000-Report" Tape Recorder (Battery Compartment), Mfd. by Uher, W. Germany.

Primary Examiner—Robert J. Hickey
Attorney, Agent, or Firm—B. B. Olive

[57] ABSTRACT

A family of cordless electric tools and devices is adapted to use one or more identical rechargeable battery packs and each pack is adapted to interchangeably fit into a pocket or any one of a plurality of pockets in the tool or device in which the pack is employed. The battery pack is positively but releasably retained in the respective pocket of the tool or device with which it is used. A pair of standard AC prongs extend from a flat sidewall of the battery pack which is of a relatively flat, rectangular box-like shape. The prongs are adapted for insertion into a standard AC receptacle for charging the battery pack through rectifier means contained in the pack thus eliminating the need for a separate charger. When the battery pack is positioned in the respective pocket of the tool or device, a mechanical switch is actuated by mating formations on the pack and pocket and connects the battery pack in a discharge mode so that the particular tool or device can be powered from the pack battery through the same set of AC prongs. Heavy duty tools or devices are provided with multiple pockets for the reception of a corresponding number of identical battery packs. Cordless hedge and shrub trimmers, grass shears, sprayers, screwdrivers and lanterns exemplify tools and devices suited to the invention.

42 Claims, 26 Drawing Figures

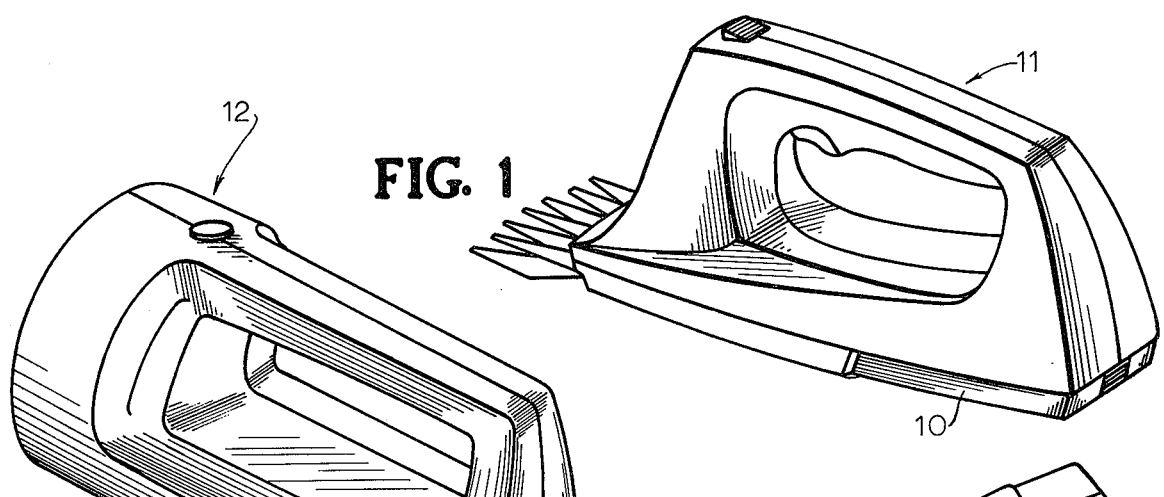
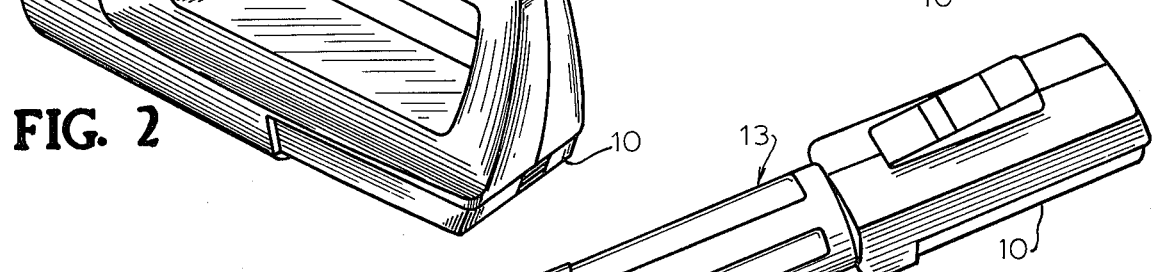
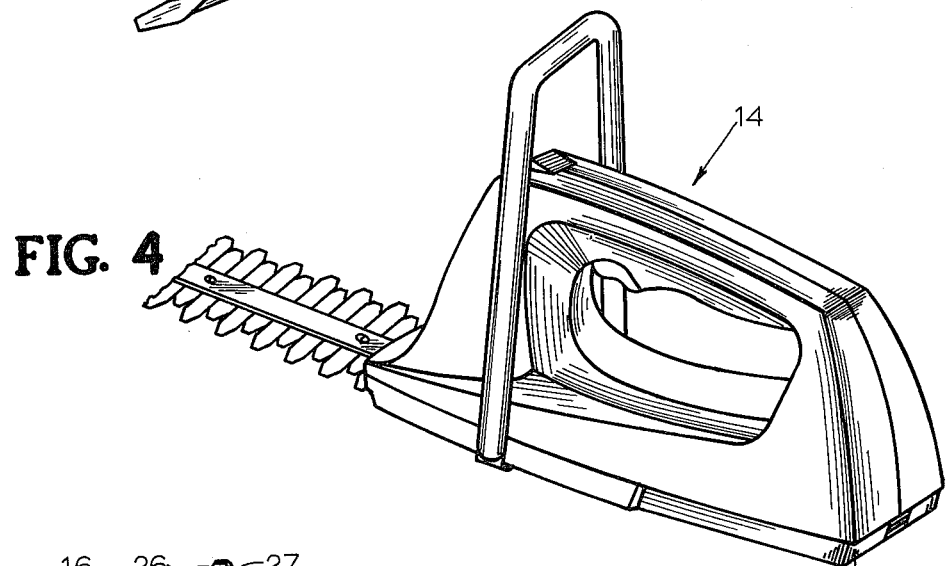
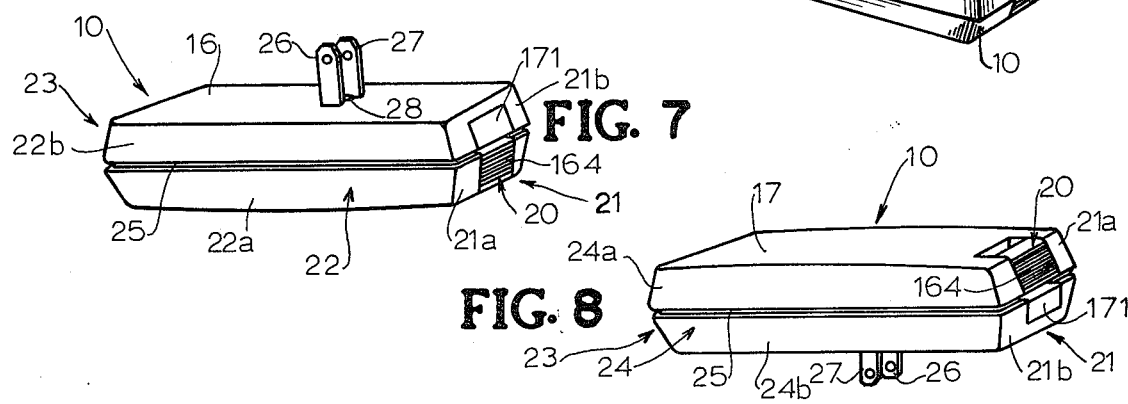
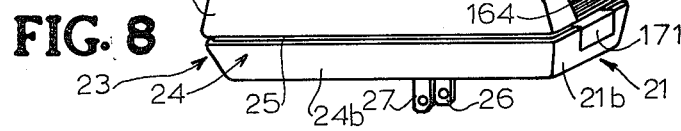

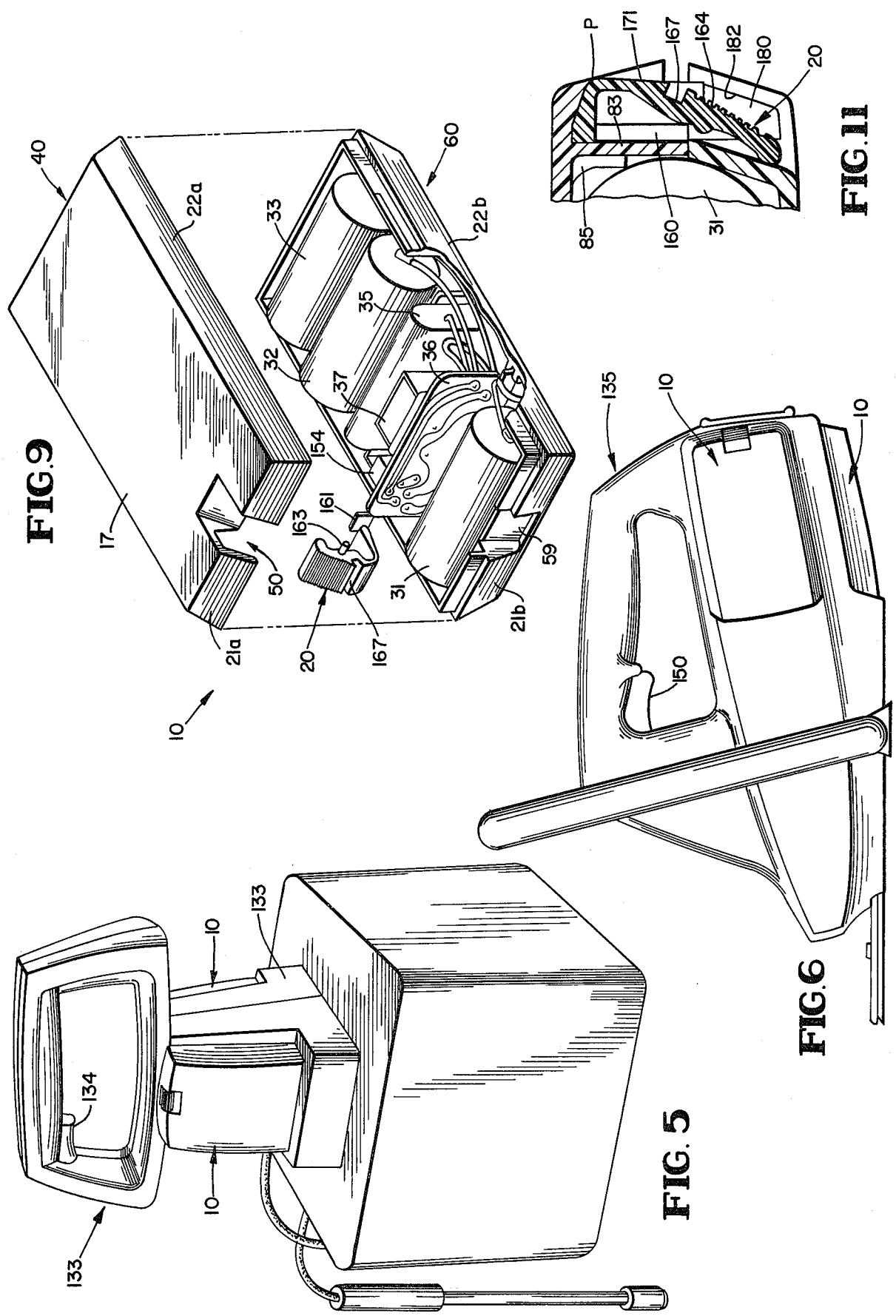

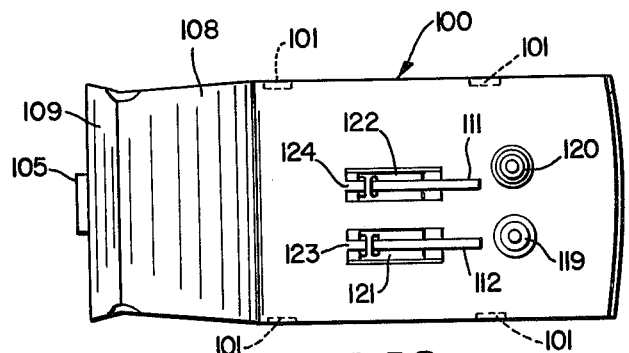
FIG.16
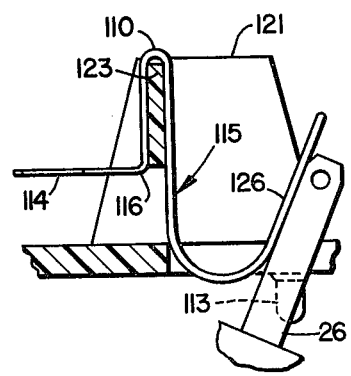
FIG.19
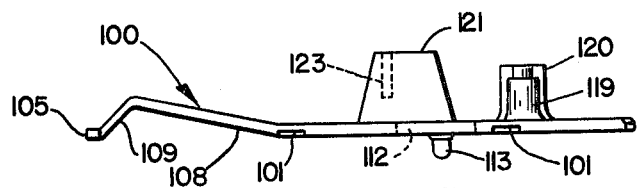
FIG.17
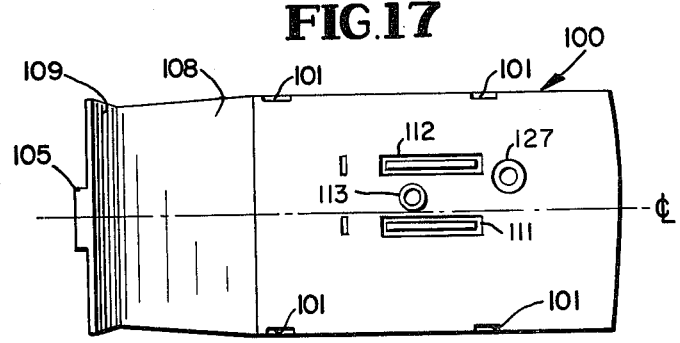
FIG.18
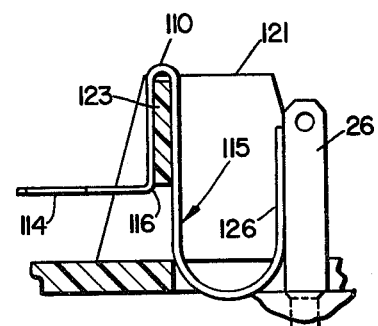
FIG.20
FIG.25
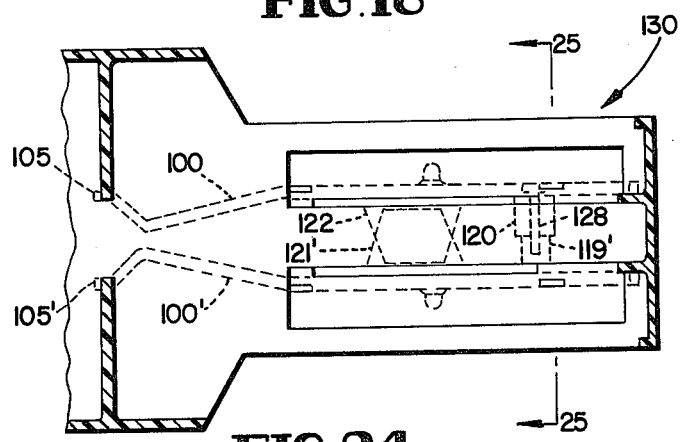
FIG.24
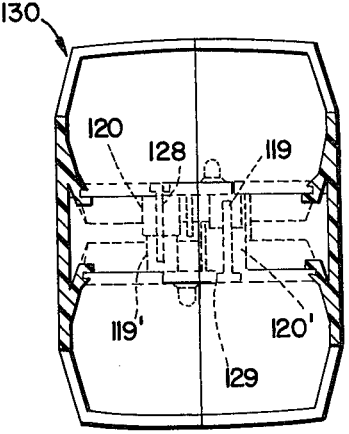
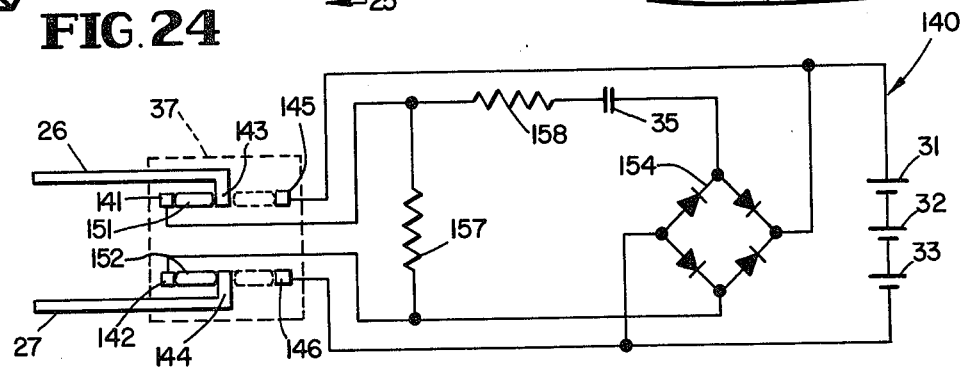
FIG.26

CORDLESS ELECTRIC DEVICES HAVING RECHARGEABLE BATTERY PACK(S)

BACKGROUND OF THE INVENTION

The availability of rechargeable batteries has led to a variety of rechargeable battery-operated "cordless" devices including grass shears, hedge trimmers, toothbrushes, shrub trimmers, lawn mowers, flashlights, sprayers, screwdrivers, and the like. In some cases the batteries are housed in a nonremovable pack. The recharging circuitry usually comprises a separare charging unit. In some cases the charging circuitry is incorporated as a part of a rechargeable battery pack. It has also been previously proposed to provide a removable battery pack having its own recharging circuitry, the pack having AC type prongs and arranged so that the pack can be interconnected through the prongs to the device to be powered or through the same prongs to a household receptacle for recharging. It has also been suggested to have a removable rechargeable battery pack that could be connected to any one of several battery power consuming devices. This concept has been proposed both for portable pocket size cordless apparatus as well as heavier portable cordless apparatus such as a cordless hedge trimmer but only for a fixed energy requirement.

A representative collection of prior art patents dealing with the foregoing constructions includes U.S. Pat. Nos. 1,506,302; Ser. No. 427,480, Zdansky (A.P.C.), published June 15, 1943; 2,628,339; 2,818,498; 2,876,410; 2,982,881; 2,995,695; 3,013,198; 3,021,468; 3,027,507; 3,067,373; Re. 25,388; 3,109,132; 3,120,632; 3,145,404; 3,183,538; 3,275,819; 3,280,351; 3,281,636; 3,329,881; 3,360,708; 3,447,058; 3,533,119; 3,623,223; 3,742,832; 3,757,194 and 3,883,789.

In a more recent development, a system now on the market is directed to a range of cordless devices including grass shears, lanterns, drills, and shrub trimmers. Each device mates with a standardized "power handle" which serves both as a handle and to contain a rechargeable battery. This handle is required to be removed and placed in a stand-type charger for recharging. Such a system points up the advantages of standardizing the power unit portion of a cordless device. However, this system makes no provision for the power handle to be used except singly. There is no provision for varying the amount of available battery power even though one device in the system might require more or less battery power than another. Also, the power handle in such a system does not, itself, contain recharging circuitry and the handle is not adapted to be plugged directly into a household receptacle for recharging.

Despite the extensive development of the art, there has not heretofore been provided a family of cordless portable tools or devices characterized in respect to each device in the family having one or a plurality of outwardly opening pockets adapted to receive a corresponding number of identical rechargeable battery packs according to the energy and power requirements of the individual devices and which packs can be recharged from a household receptacle through the same prongs used for discharge. Further, the prior art has not provided a relatively flat, rectangular-shaped battery pack that can be installed and removed from the particular device with the prongs arranged so as not to require guideways for sliding the pack and so as to minimize the hazard of dropping the pack.

With all of the foregoing considerations in mind, it thus becomes the object of this invention to provide a type of construction for mass production of a wide range family of portable cordless devices which for each device can be duplicated with respect to incorporating a standardized selected number of battery pack receiving pockets in the device and providing a standard type of rechargeable battery pack unit incorporating recharging circuitry and which can be used singly or in plural groups corresponding to the number of pockets in the particular device and which can be safely placed in an ordinary household receptacle for recharging purposes.

SUMMARY OF THE INVENTION

The present invention is directed to individual portable cordless devices of the type which use removable rechargeable battery packs as well as to a family of such devices which are adapted to use a selected number of such battery pack units. Each device in the family has a housing which has one or more pockets of unique construction adapted to receive one or more of the interchangeable battery pack units. Thus, the invention is directed, for example, to a portable cordless device whose power requirements are such that only one of the rechargeable battery pack units is required. The invention is also directed to that type of portable cordless device whose power requirements might require two or three or more of such battery packs. Thus, the invention provides a versatile construction suitable to a wide range of types of devices and which may vary widely in the nature of the electrical load and in such matters as torque, peak power demand and speed.

In accordance with the present invention, each power consuming device or tool is complete requiring only the installation of one or more battery packs to render it operative. For example, the grass shear of the invention includes a motor properly sized to provide optimum performance for its specific purpose, i.e., grass shearing, and has a housing and handle formation to provide a balance and convenience of operation equal to that afforded by prior conventional grass shears. Similarly, the hedge trimmer of the invention is provided with a larger motor and a different housing and handle formation particularly suited to hedge trimming.

The invention devices thus contrast with prior devices of the type utilizing a common power handle which, unlike the present invention, necessarily requires compromise in construction and operation in any tool or device which is in the family of tools or devices using such a handle.

With respect to the power consuming device or unit, the invention is directed to forming one or more outwardly opening pockets in the housing of such device, each pocket having its base plane defined in the preferred embodiment by a base plate member which is the same for all members in the family of devices and which plate member includes an electrical receptacle for receiving the electrical prongs or blades of the battery pack. The plate member also co-operates with the remaining pocket structure to facilitate insertion, retention and removal of the battery pack.

As to the battery pack unit of the invention, such battery pack is characterized by being in a rather rectangular flat box-like shape and having a pair of AC type prongs projecting from a position intermediate the length and width of one flat sidewall surface of the pack. These prongs are adapted to be received by a corresponding set of receptacle openings provided in the base plate member or, for recharging, to be received by an ordinary household receptacle supply. The weight of the battery, rectifier means and a switch incorporated in the battery pack, is distributed both longitudinally and laterally over the battery pack so as to minimize the moment exerted by the pack whether the household receptacle openings being utilized are oriented vertically or horizontally.

Each pack is mechanically latched to its respective pocket and does not depend on its prongs for such mechanical interlocking.

The switch in the battery pack unit comprises a double-pole, double-throw, spring-loaded switch which is incorporated as a part of an AC prong assembly which mounts both the AC prongs of the battery pack and the switch. This switch connects the rectifier means to the battery during recharging and is activated and spring-loaded when the pack is installed and latched in its pocket to connect the prongs to the battery for discharge without requiring manual switching. Also, the switch spring causes the pack to tilt, i.e., to pop out, when unlatched.

To facilitate insertion, retention and removal of the pack, the pocket in each device in the family of devices is provided with an outwardly opening receptacle formation at one end of the pocket so that the battery is inserted and removed by first assuming a tilted position. When the battery pack is unlatched, it pops out and initially assumes such an outwardly tilted position. It is then withdrawn from the pocket by linear motion. During insertion, one end of the battery pack is first inserted in the receptacle formation in a tilted position and is then rocked about the inserted end of the pack, the receptacle formation insuring insertion of the prongs of the pack into the mentioned housing base plate receptacle of the device after which it is latched.

In one form of the invention the housing of the device is provided with oppositely facing pack receiving pockets positioned back to back.

The electrical receptacle in the base plates are offset from the base plate centerlines to permit the receptacles to interfit when arranged back to back thus permitting a substantial reduction in the bulk and weight of the tool. The contact blades or prongs of the pack are similarly offset. To assure uniformity of the packs and pockets the offset construction is also used where the tool requires only one battery pack.

The invention also includes the use of a pair of spring contacts in the prong receiving receptacle of the device which makes both electrical and mechanical contact with the edges of the prongs being inserted and which insure both positive electrical and mechanical contact with the prongs. The mentioned switch spring in conjunction with these spring contacts causes the pack, when unlatched, to pop out as described. A configuration of internal rib constructions are incorporated within the pack housing which secures the internal components against end as well as side-applied shock. The device housing and the pack lend themselves to use of clam shell type housings which greatly facilitates fabrication of the device and pack on a mass production basis.

DESCRIPTION OF THE DRAWINGS

FIG. 1 is a pictorial view of a cordless electric grass shear and battery pack of the present invention;

FIG. 2 is a pictorial view of a cordless electric lantern with a battery pack of the invention;

FIG. 3 is a pictorial view of a cordless electric screwdriver and battery pack;

FIG. 4 is a pictorial view of a cordless electric shurb trimmer with the battery pack of the present invention;

FIG. 5 is a pictorial view of a garden sprayer incorporating dual pockets with two battery packs in a vertical orientation;

FIG. 6 is a side view of a heavy-duty shrub trimmer adapted to receive three battery packs in a balanced arrangement;

FIG. 7 is a perspective view illustrating the battery pack showing the AC prongs and latch feature;

FIG. 8 is an inverted perspective view of the battery pack and showing the latch feature;

FIG. 9 is an exploded, fragmentary view of the battery pack with a portion of the pack cutaway to show the inner components;

FIG. 11 is an enlarged fragmentary section of the latch showing the latch in its depressed position;

FIG. 16 is a view of the inner surface of the pocket base plate or liner and shows the slot openings for receiving the AC prongs of the pack;

FIG. 17 is a side view of the pocket base plate or liner illustrated in FIG. 16;

FIG. 18 is a view of the outer surface of the liner;

FIG. 19 is an enlarged, fragmentary view of the spring contact member as it is initially engaged by the AC prong edges of the battery pack during insertion of the pack;

FIG. 20 is a view similar to FIG. 19 showing the prongs fully inserted;

FIG. 24 is a side section view of a portion of the housing for a battery-operated device with dual pockets to hold two battery packs in a horizontal orientation;

FIG. 25 is a section view of the dual pockets of FIG. 24 taken substantially along line 24—25 of FIG. 24; and FIG. 26 is a schematic circuit diagram of the charging and discharging circuitry of the battery pack.

DESCRIPTION OF THE PREFERRED EMBODIMENTS

Figure 10:
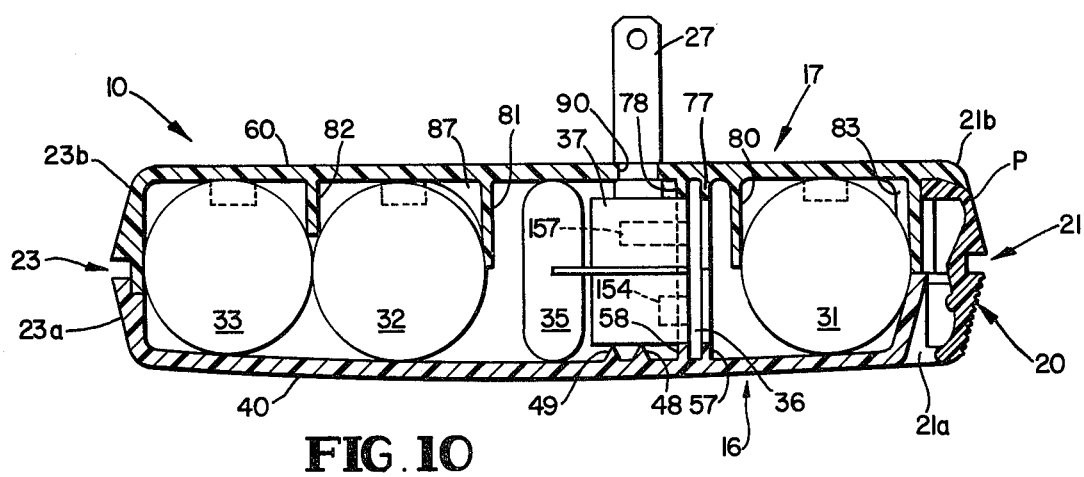
FIG. 10 is a vertical central section of the pack showing the latch in its normal position and with the wiring removed for purposes of illustration.
Figure 12:
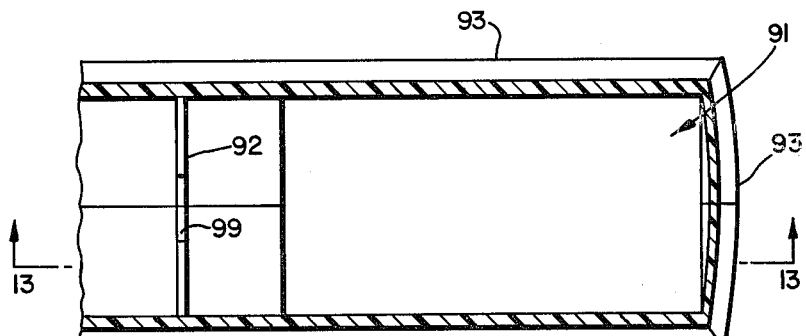
FIG. 12 is a section through the battery pocket.
Figure 13:
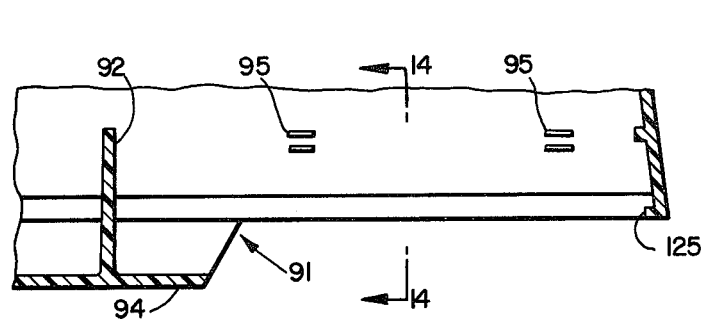
FIG. 13 is a vertical section of the pocket, along line 13—13 of FIG. 12.
Figure 14:
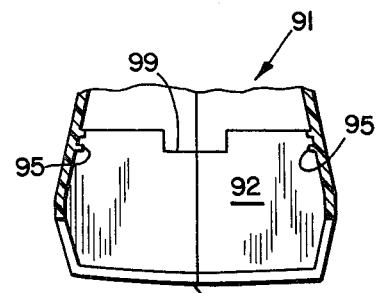
FIG. 14 is an end section view of the pocket, along line 14—14 of FIG. 13.

FIGS. 1-6 illustrate a system of six cordless, portable devices and tools which utilize one or more of the same interchangeable, rechargeable battery packs 10 as the source of power. Each tool or device is shown with one or more pack receiving pockets which receive the pack or packs and provides electrical connections to the tool or device. FIG. 1 depicts a lightweight grass shear 11 adapted to cut relatively narrow swaths of grass; FIG. 2 shows a lantern 12; FIG. 3, a screwdriver 13; and FIG. 4, a lightweight shrub trimmer 14. The versatility of the system is further illustrated with reference to tools and devices having heavier load requirements, as later explained, and as seen in FIG. 5 and FIG. 6 showing a cordless sprayer 133 having two packs 10 and a heavy duty hedge trimmer 135 having three packs 10 and each with a corresponding number of the standardized pockets. Each tool or device provides a handle formation.

Referring to FIGS. 7 and 8, battery pack 10, in the embodiment illustrated, has a generally rectangular, flat boxlike shape, i.e., a rectangular parallelepiped shape, and has rectangular, generally flat, side wall surfaces 16 and 17. Pack sides 21, 22, 23, 24, formed by side components 21a, 21b, 22a, 22b, 23a, 23b, 24a and 24b, provide a groove 25 which encircles the pack. Pack 10 of the present embodiment has its own latch as will be described. However, if the latch is made a part of the tool or device housing groove 25 can be used to receive the latch and retain the pack.

A pair of standard rigidly mounted AC blades or prongs 26, 27 extend from surface 16 and are oriented parallel to the central long axis of pack 10 with the prongs being located at a position intermediate the length and width of the wall surface 16. The blades are on opposite sides of, and offset different distances from, the longitudinal centerline of the pack for a purpose to appear.

Located between prongs 26, 27 is a switch actuator 28 which is engaged by a post member 113 in tool pocket 91 to switch the pack circuitry from the charging to the discharging mode when pack 10 is installed in a manner to be described later. Side surface 21 is provided with a resilient latch member 20 which is adapted to engage a ledge portion of the tool pocket in order to hold the pack in place.

FIG. 9 shows the outer pack body member 40 separated from pack body member 60 to show the internal components of the battery pack 10. Members 40 and 60 are essentially a pair of secured rectangular pan-shaped clam shell members. The internal components illustrated in FIGS. 9, 10 and 26 include rechargeable nickel-cadmium sub-c batteries 31, 32, 33, capacitor 35, printed circuit board 36, switch 37, diode bridge 154 and resistors 157, 158. Such circuitry minimizes weight and heat.

Members 40 and 60 are approximately 2 inches by 4½ inches by ½ inch, have a wall thickness of about ⅛ inch and are preferably molded of an impact resistant, flame retardant polycarbonate. The interior wall surfaces of member 40 are provided with upper circuit board locators 57, 58 into which circuit board 36 slides into place during assembly. The interior of the top wall also includes two spike members 48, 49 which are positioned over switch 37 as shown in FIG. 10 to hold the switch in a rattle-proof, shock proof manner. A recessed area is provided in the front wall surface 21a of member 40 to accommodate latch 20. The recessed area and associated structural members will be described in conjunction with the description of latch 20.

Body member 60 is provided with battery locating ribs that aid in locating the batteries during assembly and also serve to keep the batteries in position during use and thereby reduce rattling. The interior of member 60 is also provided with lower circuit board locators 77, 78 which are aligned with upper circuit board locators 57, 58 and serve as a means of locating the circuit board during assembly and keeping the circuit board in position during use. A pair of live ribs 80, 81 span the width of member 60 and provide compartments for batteries 31, 32, 33. Live ribs 80, 81 are designed to be resilient and absorb shock from the batteries when the pack is accidentally dropped on either end. Structural ribs 82, 83 also serve to define compartments for batteries 31, 32, 33. The structural ribs 82, 83 are rigid and are designed to lend strength to the overall construction of the pack. The body members are snap fitted together and are then ultrasonically welded together.

Member 60 is provided with two slots through which AC prongs 26, 27 protrude. An aperture 90 is aligned over switch actuator 28 to expose the latter to a switch activating post 113 in the tool pocket as described later. The prong slots and aperture 90 are located off the centerline of member 60 to facilitate the construction of a dual pack as illustrated in FIGS. 5 and 6 and described later.

Member 60 also has a recess 59 for accommodating latch 20 which will now be described. Latch 20 in one embodiment was molded from an acetal resilient plastic material. Latch 20 provides a front notched surface 164 and a smooth front surface 171. Intermediate the length of the front surface is a latch groove 167 which is positioned so as to align with power pack groove 25 when latch 20 is in its normally non-depressed position in pack 10. Latch 20 also provides latch alignment members 160 and restraining knobs 163.

As best shown in FIG. 11, during assembly of pack 10, latch 20 slides into place with alignment members 160 against structural rib 83 on member 60 of pack 10.

After latch 20 is positioned in member 60, member 40 is snap-fitted and ultrasonically welded to member 60 so that the upper portion of latch 20 resides within recess 50 of member 40. When latch 20 is in its normally non-depressed position, front surfaces 164 and 171 essentially form a continuation of pack side member 21 as best shown in FIGS. 7 and 8.

The installed latch is adapted to hold pack 10 in place within pocket 91 by engagement of latch groove 167 and pocket lip 125 which is co-extensive with the latch. When pack 10 is pivoted or hinged into place in the manner previously described, pocket lip 125 initially engages smooth front surface 171 and causes resilient latch 20 to bend at point P (FIG. 11) to the depressed position shown in FIG. 11. Upon full insertion of pack 10 into pocket 91, lip 125 will fall into groove 167 thereby allowing latch 20 to return to its non-depressed position (FIG. 7). Knobs 163 on latch 20 are adapted to engage cavity wall surfaces 182 in member 40 when the latch is in its non-depressed position thereby preventing the latch from being pulled outwardly from the pack 10 beyond its normal position.

The battery pack unit 10 just described is adapted to fit into any one of the pockets, in any of the tools and devices which are part of the family of devices made according to the invention. What is next to be described is the pocket construction which can be employed singly or plurally in the devices and tools made according to the invention, so that any pocket can accept any pack which allows any pack to be used with any tool or device in the family in single and plural groups as required.

The receiving pocket 91 for the standardized pack 10 is depicted in FIGS. 12-14 and 21-23. In the embodiment being used for illustration, the standardized pocket 91 is formed as an integral part of the tool clam shell housing 93. Pocket 91 can be formed in the housing of each tool or device at a point where the battery pack 10 can be easily inserted into the pocket and provide overall tool balance. Pocket 91 is also adapted to provide means for locating and holding in place a standardized pocket liner 100 which is illustrated in FIGS. 16–18. In order to receive liner 100, each housing for the particular tool or device includes a plurality of liner locators 95 which extend from the housing interior wall surfaces of pocket 91 and are adapted to engage locator grooves 101 in liner 100. A front housing wall member 92 of pocket 91 is provided with a recess 99 which is adapted to receive a projection 105 on liner 100 as a further means for locating and holding in place liner 100. Pocket 91 is devoid of guideways and the like which enables the pack to be tiltably inserted and removed and to pop out when unlatched as elsewhere discussed.

It should be emphasized here that so far as is known, there has not been available in the marketplace a coordinated family of cordless, portable tools and devices having varying power requirements and in which each tool or device in the family has a housing which both forms a handle and mounts battery power consuming apparatus and in which such housing is adapted with one or more standardized outwardly opening pockets to accept a comparable number of identical battery packs with each pack having a battery recharging circuitry, AC type prongs and switching mechanism enabling the pack to be recharged from a household receptacle or to be used to power the device or tool.

A part of the present invention resides in providing a variety of portable cordless devices each of which can be powered by one or more removable rechargeable identical battery packs. In what is believed to be a departure from prior art practices, the battery receiving pocket in each housing includes the same base plate or liner member which provides a means for standardizing the location of the base and side peripheral planes of the pocket and for standardizing the positioning and securement of the AC prong receptacle openings in the tool and device. Thus a standardized outwardly opening pocket is achieved which can be used over a wide range of portable cordless tools and devices, e.g., grass shears, lanterns, sprayers, hedge trimmers, and the like.

Referring particularly to FIGS. 16–20, the pocket liner 100, which is a common component of each tool or device and serves as a base wall in pocket 91, includes a flat outer surface 107, an inwardly inclined surface 108, a lip portion 109, and an extension 105. Flat surface 107 is adapted to engage the flat inner wall surface of battery pack 10 when pack 10 is inserted into the pocket. Surfaces 108, 109 are adapted to facilitate the pivotal insertion and removal of pack 10 as later described. Surface 107 provides two prong receiving chamfered slots 111, 112.

As later explained, the circuitry provides for the internal battery pack to be normally connected to the AC prongs for recharging. However, the battery pack and device housing pocket are also provided with means to switch the internal battery pack circuitry to connect the AC prongs to the battery for discharge and use as a power source whenever the pack is inserted in the pocket. In this regard, it may be noted that switch activation post 113 is located between slots 111 and 112. When pack 10 is fully inserted into pocket 91, post 113 engages switch actuator 28 so as to switch the circuitry of pack 10 into the discharging mode. Contact spring holders 121, 122 provide in a central portion thereof post members 123, 124 which are each adapted to receive a contact spring 115 as best shown in FIGS. 19 and 20. Contact spring 115 is a curved leaf spring of resilient conductive metal having a loop locator portion 110, a retainer member 116, a U-shaped prong engagement portion 126, and a wire lead solder contact 114. Loop 110 is adapted to be press-fitted over one of post member 123, 124. When loop 110 is pressed into place, resilient retainer member 116 locates on post member 123 or 124 in order to hold contact spring 115 in place. Prong engagement portion 126 is normally in the external position shown in FIG. 19. As pack 10 is pivoted into pocket 91, one of prongs 26, 27 contacts spring 115 and bends it until pack 10 is fully inserted (FIG. 20). Spring 115 is thus adapted to provide exceptionally reliable electrical contact with the leading edges of AC prongs 26, 27. Wire lead solder contact 114 of contact spring 115 is adapted to electrically connect spring 115 to the appropriate wire leads of the tool motor or other device apparatus. Screw bosses 119, 120 serve as means to secure together two liners in the dual pocket version which will be described later with reference to FIGS. 24 and 25.

Figure 22:
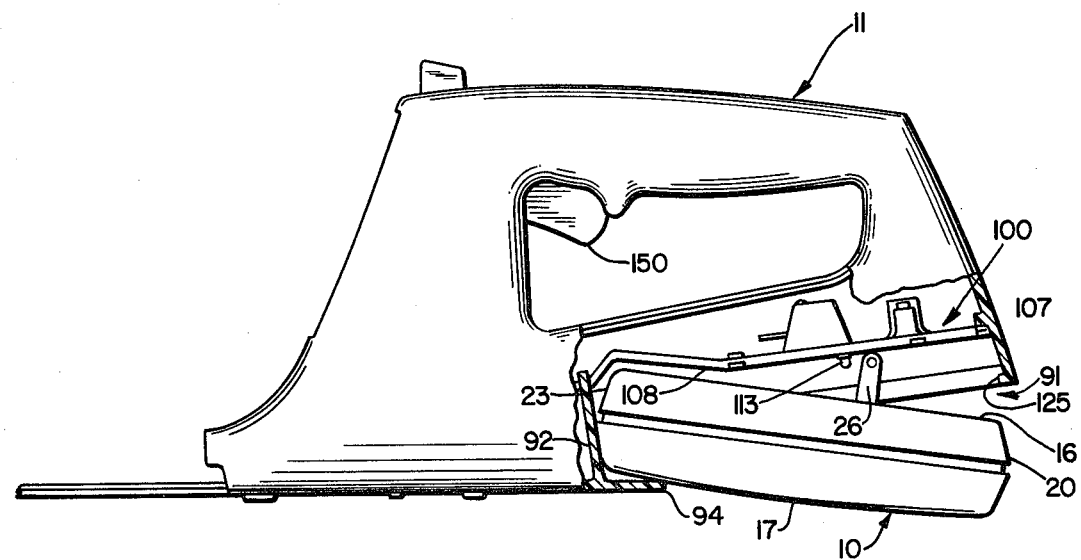
FIG. 22 is a side view of a grass shear of the present invention with a portion of the shear housing broken away to illustrate the pocket and liner and a battery pack in the partially removed position.
Figure 23:
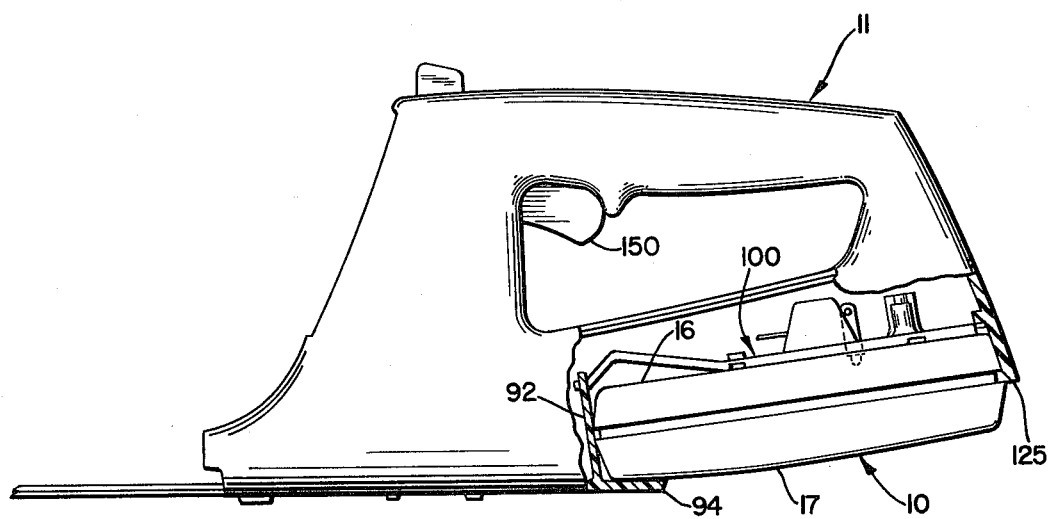
FIG. 23 is a view similar to FIG. 22 with the battery pack inserted.

The method of insertion and removal of pack 10 into pocket 91 is best illustrated in FIGS. 22 and 23 with respect to a typical grass shear 11 adapted with a single pocket 91 and battery pack 10 according to the invention. The shear 11 is held by one hand with the pocket 91 facing downwardly. With the other hand, the operator picks up pack 10 with prongs 26, 27 facing upwardly. The end 23 of the pack 10 opposite latch 20 is then inserted into pocket 91 with surface 17 of pack 10 resting on pocket ledge 94 and with pack surface 16 residing proximate incline surface 108. Pack 10 is now rocked about ledge 94 until the side surface 16 of pack 10 lies flush against flat surface 107 of liner 100 (FIG. 23). During this rocking movement, prongs 26, 27 enter chamfered slots 111, 112 until prongs 26, 27 engage and bend contact springs 115. Also, during this rocking motion, spring activation post 113 engages switch actuator 28. When pack 10 is fully inserted, pocket lip 125 engages latch groove 167 in order to hold pack 10 in place without requiring guideways or the like. Thus the front receptacle portion of the pocket formed by the portions 108 and 109 of the liner, housing wall 92 and ledge 94 locates the pack for insertion, supports the pack during the rocking movement and holds the forward end of the pack securely in place.

It should be noted that the internal spring for switch 37 (FIG. 10) and contact springs 115 (FIG. 19) are both compressed by latching of pack 10. Thus pack 10 tends to tilt and pop out when unlatched. The removal of pack 10 from pocket 91 becomes a two-step operation which provides a degree of protection against accidental unlatching or dropping of pack 10. First, latch 20 is depressed so that latch groove 167 disengages pocket lip 125 and by the mentioned spring action and possible force of gravity, dependent on how the tool or device is positioned, pack 10 moves to and is held in a partially removed position as illustrated by FIG. 22. Thus, if latch 20 is accidentally depressed, pack 10 can move to the partially removed position and remain there until reinserted or removed.

FIGS. 5, 24, and 25 illustrate use of dual packs and pockets for tools or devices having high energy demands. The two-pack pocket 130 is adapted to receive two of the battery packs 10 with the packs' inner surfaces and AC prongs facing each other. Since the AC prongs on each battery pack 10 are offset from the longitudinal centerline of the pack, the opposing prongs of the two battery packs when inserted into pocket 130 interfit permitting a much more compact arrangement than would otherwise be possible and substantially reducing the bulk and weight of the tool.

The assembly of pocket 130 is facilitated by the mating of male bosses 119, 119' with female bosses 120, 120'. Screws 128, 129 are inserted into countersunk holes 127 (FIG. 18) which are located at the base of female bosses 120, 120'. Screws 128, 129 secure the bosses and, in conjunction with extensions 105, 105', serve to hold together liners 100, 100' in a parallel spaced relation. An important feature of pocket 130 is the interfitting of contact spring holders 121, 122, 121', 122'. As best shown in FIG. 16, contact spring holders 121, 122 are located offset from the centerline of liner 100 so that when liners 100, 100' are interconnected by their respective bosses 119, 120, 119', 120' in the assembly of a two pack pocket 130, the contact spring holders 121, 122, 121', 122' interfit so that the liners 100, 100' can be closely nested together to form pocket 130.

The two-pack pocket 130 accommodates tools or devices with higher energy demands than the single pack tools illustrated in FIGS. 1-4. A representative tool requiring a two pack pocket 130 is the heavy duty garden sprayer 133 illustrated in FIG. 5 and adapted to receive two oppositely disposed vertically end oriented packs 10.

A heavy duty hedge trimmer 135 requiring even more energy is illustrated in FIG. 6. Trimmer 135 is adapted to receive three packs 10 with one pack generally horizontal and fitting in a bottom pocket as in the tools of FIGS. 1-4 and two packs generally vertically side oriented fitting in opposite side pockets generally as shown in FIG. 24. Tool balance is achieved in all of the embodiments.

Figure 15:
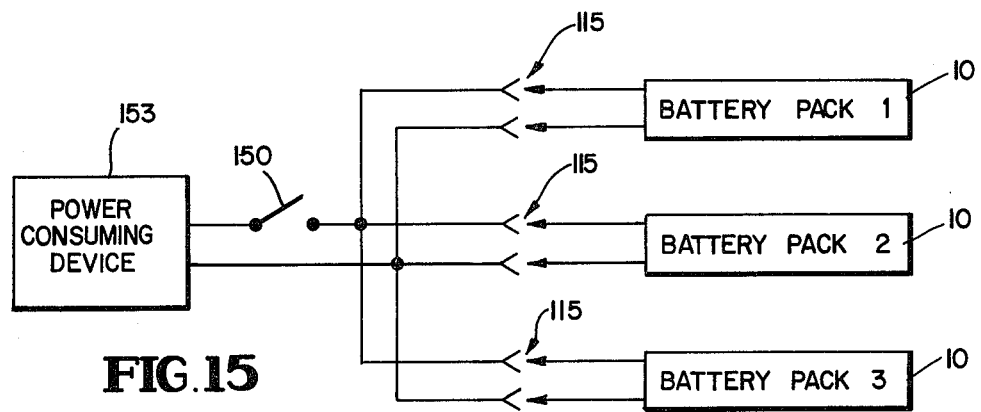
FIG. 15 is a schematic diagram of the electrical circuitry of a typical multiple pack tool or device.
Figure 21:
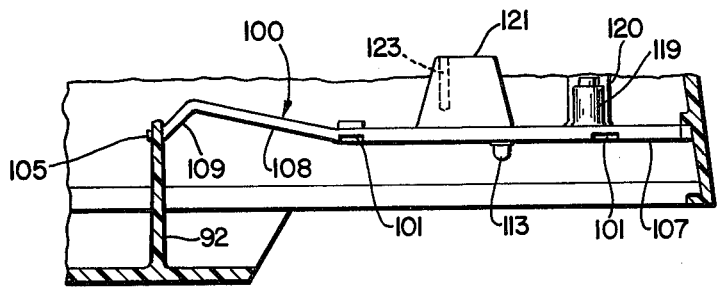
FIG. 21 is a vertical section of the pocket similar to FIG. 13 with the liner installed.

The electrical circuitry of a typical multiple pack tool or device illustrated in FIG. 15 and the pack circuitry is illustrated in FIG. 26. In FIG. 15, power consuming device 153 is illustrated as being a heavy duty device adapted to hold up to three battery packs 10 which are connected through manually operable switch 150 to the load unit of device 153 by the electrical contacts 115. Packs 10 are connected in parallel so that only one switch 150 needs to be located on device 153. Although a multiple pack tool or device will normally be operated with a battery pack 10 in each pack pocket, the parallel circuitry enables the operator to run the multiple pack tool or device with one or more of the pockets empty, though series circuitry can be employed.

In all the embodiments illustrated, it is recognized that in the typical tool or device the operator trigger or other type on-off switch 150 is suitably placed for operator control as shown in FIGS. 1-6.

The charging and discharging circuitry of pack 10 will now be described with reference to the schematic circuit diagram 140 of FIG. 26. A double-pole, double-throw switch 37 is adapted to place the circuitry in either a charging or discharging mode. Switch 37 includes six terminals 141, 142, 143, 144, 145, 146. AC terminals 141, 142 are connected to the charging circuitry. DC terminals 145, 146 are connected to the discharge circuitry. Common terminals 143, 144 are connected directly to the AC prongs 26, 27 and are, in the preferred embodiment, continuations of the prongs themselves. Movable contacts 151, 152 are spring loaded in such a manner that they normally connect AC terminal 141 to terminal 143 and AC terminal 142 to terminal 144 as depicted in FIG. 26. The charging circuitry comprises (1) a capacitor 35 which is adapted to drop the input voltage; (2) a diode bridge full wave rectifier 154; (3) batteries 31, 32, 33 connected in series; (4) a bleed resistor 157 which is selected to quickly bleed by completing a RC circuit with a short time constant; and (5) a surge resistor 158 which prevents the diode bridge 154 from receiving a large surge when capacitor 35 is completely discharged. The discharge circuitry is, of course, a direct connection between AC prongs 26, 27 (terminals 143, 144) and batteries 31, 32, 33.

The described pack circuitry has several practical advantages in that such full wave rectification circuitry minimizes both weight and internal heat. Pack 10 can essentially be encapsulated, though aperture 90 is preferably designed to provide sufficient clearance, both for member 28 and to vent pack 10 in the event of extraneous battery gases. In contrast, recharging circuitry of other types, e.g., half-wave rectification, would both increase weight and temperature and require positive venting.

As described previously, when battery pack 10 is assembled, switch actuator 28 is disposed between prongs 26, 27 in aperture 90.

When pack 10 is fully inserted into a standard tool pocket 91, switch activation post 113 is positioned so as to align with aperture 90 and depress switch actuator 28. The depression of actuator 28 compresses the return spring in switch 37 and places pack 10 in a discharge mode. At all times when pack 10 is not fully inserted into a pocket 91, pack 10 will be in the charging mode. This safety feature aids in preventing accidental discharge of pack 10 as well as preventing accidental shortage.

Pack 10 is plugged into a standard AC receptacle during charging, as previously explained, and uniquely complies with all known requirements relating to maximum weight for unsupported devices plugged into AC wall receptacles and maximum moment arms which can be exerted on the prongs when they are plugged into the receptacle. In the preferred embodiment, pack 10, including all of its components, weighs approximately 7.82 ounces. When pack 10 is plugged into a standard vertically aligned AC receptacle, the moment produced is approximately 4.4 inch ounces. When pack 10 is plugged into a horizontally aligned AC receptacle, the moment is approximately 4.9 inch ounces. In the embodiment shown, pack 10 has a width of about 2 inches, a length of about 4½ inches, and a thickness of about 1 inch. Of particular significance is the fact that the pack is easy to grasp and handle and the particular arrangement of components allows the pack to be safely inserted in a standard receptacle whether the receptacle openings are vertically oriented or horizontally oriented. Thus, it can be seen that pack 10 provides a very useful configuration for multiple use, interchangeability and as a self-contained battery charger and still meets requirements for unsupported household receptacle rechargeable devices.

While recharging of the pack from a household receptacle is contemplated in the preferred embodiment, it is also contemplated, while not being shown, that the pack can be recharged in a suitable recharging stand. For example, such a stand may contain a suitable horizontal receptacle to receive and connect the pack prongs for recharging as well as actuate the switch 37 with the stand receptacle being connected to a separate AC supply. Also, such a stand may contain suitable circuitry for reducing the available AC voltage as, for example, in overseas use where higher receptacle voltages are experienced. Additionally, such a stand could employ supplemental fast charging circuitry to reduce the time required for recharging.

From the foregoing, it can be seen that the system of the invention thus provides both a unique battery pack as well as a unique battery pack pocket construction suited to economical mass production and which lend themselves to interchangeability of any pack with any pocket, multiple use of any pack with any tool or device, grouping of packs in plural groups for increasing available power, providing for any pack to be recharged simply by plugging into a typical 110-120 volt AC household receptacle and maintaining tool balance.

In summary, the invention now provides a unique system especially suited to portable cordless tools for which widespread application is envisioned. While single, two and three pack applications have been illustrated, it is, of course, apparent that a greater number of packs could be employed and that the specific pack and pocket constructions could be otherwise standardized without departing from the invention as hereafter claimed. Also, with other methods of recharging, it is apparent that the pack itself could be both larger and heavier while retaining many advantages of the invention. While the use of a separate standardized pocket liner or base member secured between clam shell housing halves is a preferred construction, it is also envisioned that a standardized pocket base plane could be established by molding the pocket base plate as part of the tool or device housing.

What is claimed is:

1. A rechargeable battery pack for external mounting in a portable device comprising an elongated substantially rectangular box-like housing having at least one substantially rectangular flat base wall and side walls, the area of the base wall being greater than the area of any of the side walls and containing electrical battery means, a rectifier and a pair of external contact blades projecting rigidly from said base wall of the pack housing, said blades being adapted for insertion into a conventional household electrical outlet, said blades being disposed intermediate the length and width of said base wall, a circuit within said pack housing comprising a switch having connections to said rectifier and battery means and having an actuator adjacent said base wall, said switch being spring biased to connect said battery means to said blades through said rectifier when the pack is not mounted on the device and adapted to being actuated by means on the device to connect the battery means to discharge through the blades upon mounting the pack in said device, and releasable latch means mounted on one end of said pack housing enabling said pack housing to be releasably secured in a mating outwardly opening recess of said device.

2. A rechargeable battery pack as claimed in claim 1 wherein said latch means comprises a resilient strip member mounted in one end of said housing and having a latch portion adapted to be releasably secured to a mating portion of said device.

3. A rechargeable battery pack as claimed in claim 1 wherein said blades are disposed on opposite sides of the longitudinal centerline of said flat wall.

4. A rechargeable battery pack as claimed in claim 3 wherein said blades are offset different distances from said centerline.

5. A rechargeable battery pack for external mounting in a portable device comprising an elongated substantially rectangular box-like housing having at least one substantially rectangular flat side wall and containing electrical battery means, a rectifier and a pair of external contact blades projecting rigidly from said side wall of the pack housing, said blades being adapted for insertion into a conventional household electrical outlet, said blades being disposed intermediate the length and width of said flat wall, a circuit within said pack housing comprising a switch having connections to said rectifier and battery means and having an actuator adjacent said wall, said switch being spring biased to connect said battery means to said blades through said rectifier when the pack is not mounted on the device and adapted to being actuated by means on the device to connect the battery means to discharge through the blades upon mounting the pack in said device and releasable latch means mounted on one end of said pack housing enabling said pack housing to be releasably secured in a mating outwardly opening recess of said device, said latch means comprising a resilient strip member mounted in one end of said housing and having a latch portion adapted to be releasably secured to a mating portion of said device.

6. A rechargeable battery pack for external mounting in a portable device comprising an elongated substantially rectangular box-like housing having at least one substantially rectangular flat side wall and containing electrical battery means, a rectifier and a pair of external contact blades projecting rigidly from said side wall of the pack housing, said blades being adapted for insertion into a conventional household electrical outlet, said blades being disposed intermediate the length and width of said flat wall on opposite sides of the longitudinal centerline of said flat wall and offset different distances from said centerline a circuit within said pack housing comprising a switch having connections to said rectifier and battery means and having an actuator adjacent said wall, said switch being spring biased to connect said battery means to said blades through said rectifier when the pack is not mounted on the device and adapted to being actuated by means on the device to connect the battery means to discharge through the blades upon mounting the pack in said device and releasable latch means mounted on one end of said pack housing enabling said pack housing to be releasably secured in a mating outwardly opening recess of said device.

7. A rechargeable battery pack for mounting in a portable device comprising an elongated housing having at least one side wall and containing electrical battery means, a rectifier and a pair of external contact blades projecting rigidly from said side wall of the housing, said blades being adapted for insertion into a conventional household electrical outlet, said blades being disposed on opposite sides of and laterally offset different distances from the longitudinal centerline of said side wall, the planes of said blades being parallel to said longitudinal centerline, a circuit within said housing comprising a switch having connections to said rectifier and battery means and having an actuator accessible through an opening in said wall located between the blades, said switch being spring biased to connect said battery means to said blades through said rectifier when the pack is not mounted on the device and being actuated by means on the device projecting into said opening to automatically connect the battery means to discharge through the blades upon mounting the pack in said device.

8. A rechargeable battery pack as claimed in claim 7 having releasable latching means for releasably securing said pack to said device.

9. In a portable battery powered device, a housing enclosing an electrical apparatus adapted to operate from a battery pack, said housing having a pack receiving pocket with an outwardly open side, a substantially rectangular base wall member rigid with said housing and forming the bottom wall of said pocket opposite the open side thereof, said base wall member having a pair of elongated prong receiving openings, internal prong contacts adjacent said openings, means for electrically connecting said prong contacts to said apparatus, said openings and contacts being adapted to receive a pair of contact prongs of the type adapted for insertion into a conventional AC household receptacle, an elongated battery pack housing enclosing battery means, said pack housing being adapted to fit in said housing pocket and having prongs extending rigidly outwardly from an external substantially rectangular surface of said pack housing, means within the pack housing for connecting said prongs to said battery means, and locating and pivot structure means adjacent one end of said pocket for receiving, retaining, and partially enclosing a leading end of said pack housing during assembly in position for enabling said battery pack housing to be rocked fully into the pocket after partial insertion of said pack housing into said pocket to insert said prongs into said prong receiving openings into engagement with said contacts and to thereby electrically connect said battery means to said apparatus, and means for releasably latching the inserted pack housing in the assembly.

10. The device according to claim 9 wherein said battery pack includes a rectifier and said battery pack prongs are adapted for insertion into an AC household receptacle for recharging said batteries through said rectifier, switch means in said pack housing for selectively connecting said batteries in a charge mode or discharge mode, and co-operating means carried by said pack housing and said base wall member for positioning said switch means in said discharge mode upon complete insertion of said pack into said pocket.

11. In a portable battery powdered device as claimed in claim 9 wherein said pocket internal wall configuration and said pack housing external wall configuration adapt said pack to rock out of said pocket to an outwardly angled position upon release of said latching means and said structure is adapted to hold said pack in such outwardly-angled position.

12. In a cordless portable electrically powered tool, means defining a housing having a battery pack receiving recess, and means defining the bottom of said recess comprising an elongated plate having an inwardly inclined portion at one end for receiving said pack in a tilted position during insertion in and removal from said recess, laterally spaced parallel linear openings at an intermediate portion adapted to receive a pair of contact prongs of the type adapted for insertion into a conventional household electrical outlet and a switch actuator projecting into said recess.

13. In a battery operated device in a group of similar devices each adapted to receive a selected number of battery units for powering the device, in combination, a powered unit having battery-powered apparatus and including a housing mounting such apparatus, said housing having a pocket with an outwardly open side and peripheral side walls, a rectangular base wall located opposite said open side and rigid with said housing and forming the base of said pocket, the area of said base wall being greater than the area of any of said peripheral side walls, said base wall providing receptacle openings adapted to receive a pair of AC household type prongs and with circuit means to connect such inserted prongs to said apparatus, a rectangular box-shaped battery pack unit having a housing fitting and movable within said powered unit housing pocket side walls towards and from said base wall, said pack unit mounting a battery, rectifier means connected to the battery for recharging the battery, a pair of AC household type prongs projecting from one flat substantially rectangular sidewall of the pack unit housing at a position intermediate the length and width thereof, and a switch mounted within the pack unit housing, said switch having a normal position which acts to connect said battery through said rectifier means to said prongs enabling said pack unit to be recharged by insertion of said prongs in an AC household type receptacle supply and having a second position which said switch is adapted to assume by being engaged whenever said battery unit prongs are inserted into said powered unit housing receptacle openings to connect said battery to said prongs to power said apparatus; actuator means arranged on said units to move said switch to its said second position when said prongs are fully inserted into said powered unit housing receptacle openings; and latching means for securing said units when said pack unit is fully inserted into said powered unit housing pocket.

14. In a device as claimed in claim 13 wherein said powered unit housing includes an open-ended receptacle formation at one end of said pocket and adapted to receive and partially enclose one end of said pack unit during insertion and when fully inserted therein.

15. In a device as claimed in claim 14 wherein said open-ended receptacle comprises a ledge portion adapted to support the outer end inserted surface of said pack unit when fully inserted and said base wall member provides an inwardly sloping surface within said open-ended receptacle, said ledge and said sloping surface cooperating to provide means for allowing rocking of said pack unit about said ledge as a final motion in the insertion of said pack unit and as an initial motion in the removal of said pack unit, said sloping surface providing a space for accommodating the end of said pack unit during said rocking.

16. In a device as claimed in claim 13 wherein said device includes a plurality of said pockets having said base wall member and is adapted to receive a plurality of said battery pack units.

17. In a device as claimed in claim 16 wherein said device includes an opposed pair of said pockets and is adapted to mount an opposed pair of said battery pack units.

18. In a portable cordless battery-powered device, in combination, a power-consuming unit including an electrical apparatus adapted to operate from a battery supply; and an apparatus housing mounting said apparatus, said housing having an internal compartment adjacent one outer wall portion thereof, said outer wall portion being formed with an outwardly opening pocket and having a rectangular base wall member secured between said internal compartment and pocket, the inner base boundary plane of said pocket being defined by said base wall member and the peripheral boundary side planes of said pocket being defined by planes extending perpendicularly outwardly from the edges of said base wall member, said base wall member including at a position intermediate the length and width thereof a pair of parallel elongated AC prong receptacle openings with the long axis of said openings being oriented parallel to the long axis of said base wall member, and an electrical receptacle assembly secured to the inner surface of said base wall member within said compartment and including prong contacts adjacent said openings and electrically connected to said apparatus, said receptacle assembly being adapted to receive AC household type prongs through said openings and to electrically connect said apparatus thereto; and a rechargeable battery pack unit including a rechargeable battery, rectifier means electrically connected to said battery, an AC prong assembly including a pair of AC household type prongs; a throw switch normally positioned to connect said battery through said rectifier means to said prongs and having a movable portion thereof adapted to being engaged upon full insertion of said pack unit into said pocket to move said switch to a second held position to connect said battery to said prongs, said switch being adapted to return to said normal position in the absence of such engagement; a rectangular box-like pack housing enclosing said battery, rectifier means, and throw switch, said pack housing being adapted to fit within said boundary side planes of said apparatus housing pocket and having a flat rectangular wall surface adapted to connect and mate with the outer surface of said base wall member, said prongs extending through said pack wall surface and being positioned intermediate the length and width thereof to mate with said base wall member AC prong receptacle openings thereby enabling said pack unit prongs to be inserted into said apparatus housing receptacle openings to electrically connect said prongs to said apparatus and, alternatively, when said battery pack is disengaged from said power consuming unit enabling said pack prongs to be received in a household type AC receptacle for recharging said battery through said rectifier means; co-operating latch means on said units operable to secure said pack unit to said power consuming unit upon insertion of said pack unit into said pocket, said latch means being manually releasable and enabling said pack unit to be removed from said pocket; and co-operative switch actuating means located on said units and adapted to engage said switch movable portion upon insertion of said pack unit in said pocket and when fully inserted to move said switch movable portion and hold said switch in said second position enabling said prongs to interconnect said battery and apparatus.

19. In a device as claimed in claim 18 wherein said power-consuming unit outer wall portion includes an integral ledge portion in a plane parallel to said base wall member forming an open-ended receptacle at one end of said pack unit.

20. In a device as claimed in claim 18 wherein said power-consuming unit housing includes a pair of clam shell members mounting said apparatus and forming said pocket and internal compartment and said base wall member comprises a separate, rigid, thin-wall member secured between said clam shell members and having inwardly protruding boss formations integral with said base wall member and adjacent said wall member receptacle openings, each said boss formation being adapted to receive and mount one of said prong contacts.

21. In a device as claimed in claim 18 wherein said switch actuation means comprises a post member formed on the outer surface of said base wall member, and said pack housing outer surface includes an aperture adapted to receive said post member for engaging said switch movable portion during insertion of said pack unit in said pocket.

22. In a device as claimed in claim 18 wherein said latch means comprises a resilient strip member mounted in a rearward end of said pack unit and having a latch portion adapted to be releasably secured to a mating portion of said power consuming unit housing.

23. A power-operated device comprising a housing including a handle formation thereon and having a load unit disposed therein, and switch means mounted on said housing and connected to said load unit, said housing having an outwardly opening pocket for receiving by rocking motion a battery pack having a first flat outer wall surface with AC household type prongs extending perpendicularly from a central portion thereof, said pocket having side and end wall surfaces and flat base surface with openings therein for receiving said prongs when said pack is completely inserted into said pocket, said flat base surface extending from a rear end of said pocket to a point forward of said openings and being adapted to fit flush against said pack outer wall surface upon complete insertion of said pack, said pocket also having forward of said pocket base surface additional wall surfaces forming an open inwardly disposed receptacle adapted to receive the front portion of said pack during insertion of said pack into said pocket, said receptacle including an outwardly positioned ledge portion for engaging the front portion of a second pack outer wall surface opposite said first pack surface enabling said pack to be rocked about said ledge portion and into said pocket as a final step in the insertion of said pack, and said pocket rear portion providing means cooperating with said pack for securing said pack to said pocket upon complete insertion of said pack into said pocket, whereby for inserting said pack into said pocket said pack second surface is positioned on said ledge portion with the forward end of said pack disposed in said receptacle and said pack is rocked about said ledge portion until said pack first surface is flush against said pocket base surface.

24. A power-operated device as defined in claim 23 wherein said openings comprise a pair of elongated slots with the long axis of said slots being parallel to said sidewalls.

25. A power-operated device as defined in claim 23 including prong contacts secured to the inner surface of said pocket base adjacent said openings and electrically connected to said load unit.

26. A power-operated device as defined in claim 23 wherein said recess is defined by an inwardly sloped continuation of said base.

27. A power-operated device as defined in claim 23 including an outwardly projecting post member between said openings for engaging a movable portion of a pack switch when said pack is fully inserted.

28. A device as claimed in claim 23 wherein said device includes an opposed pair of said pockets and is adapted to mount an opposed pair of said battery pack units.

29. A device as claimed in claim 23 wherein said device includes an opposed pair of said pockets adapted to mount an opposed pair of said battery pack units on opposite rearward sides of said housing and a third said pocket adapted to mount a third said battery pack unit on a bottom rear portion of said housing between said other pair of battery pack units.

30. A cooperative cordless device housing and battery pack assembly adapted for use in a device constituting one of a family of portable cordless electrically operated devices wherein each device in the family incorporates electrically operated apparatus in a housing and some of said devices require for operation greater power than that required for others in the family, said assembly comprising:
(a) a housing containing a selected electrically operated apparatus suited to a selected cordless device in said family and having a selected number of pockets each with an outwardly open side for side mounting of a comparable number of power packs corresponding to the power required for the apparatus associated with such device, each of said pockets having peripheral side walls and a substantially rectangular base wall opposite the open side thereof and rigid with said housing and forming the base wall of said pocket, each said base wall having an area greater than the area of any of said side walls and having a pair of elongated prong receiving openings, internal prong contacts adjacent said openings, said openings and contact being adapted to receive a pair of contact prongs of the type adapted for insertion into a conventional household electrical outlet, and means for electrically connecting said prong contacts to said apparatus; and
(b) a selected number of rechargeable electric battery power packs comparable in number to the number of said pockets and each being adapted to being removably inserted and mounted in any said pocket of said housing, each said pack comprising:
(i) an elongated pack housing having at least one substantially rectangular side wall and containing electrical battery means, a rectifier and a pair of external prongs projecting rigidly from said side wall, said prongs being adapted for insertion either into a conventional household electrical outlet for charging said pack or into a pair of said pocket base member openings for engaging the respective prong contacts associated therewith for powering said apparatus; and
(ii) a circuit within said pack housing comprising a switch having connections to said rectifier and battery means and having an actuator, said switch being spring biased to connect said battery means to said prongs through said rectifier when the pack is not mounted on the device and adapted to being actuated by means on the device to connect the battery means to discharge through the prongs upon mounting the pack in a said pocket;

each said power pack and pocket being of a respective substantially uniform mating construction such that the same power pack singly or in multiple may be mounted in any pocket of said housing adapting said assembly to be used in any of the devices of the family incorporating such assembly.

31. The assembly defined in claim 30 wherein said pockets are substantially identical and plural.

32. The assembly according to claim 30 wherein said apparatus housing has a plurality of pockets, two of said pockets are in back-to-back relation and said two pockets each open at a side of said apparatus housing.

33. The assembly defined in claim 30 wherein said power packs are plural and identical.

34. The assembly defined in claim 30 including locating and pivot structure means adjacent one end of each said pocket for receiving and retaining a leading end of said battery power pack in position for enabling said battery power pack to be rocked fully into the pocket after partial insertion of said battery power pack into said pocket to bring said projecting contacts into engagement with said internal contacts and to thereby electrically connect said battery power pack to the respective apparatus of said device, and means for releasably latching the inserted battery power pack in the pocket.

35. An assembly as claimed in claim 30 wherein said actuator is accessible through an opening in said wall, said switch is adapted to being actuated by means on the device projecting in said opening and including cooperating means associated with said apparatus housing and said pack enabling the switch of any such pack when completely inserted into any pocket of said apparatus housing to be actuated to connect the respective battery means thereof to discharge through the respective prongs thereof for powering said apparatus.

36. The assembly defined in claim 35 wherein said pockets are substantially identical and plural.

37. The assembly according to claim 35 within said apparatus housing has a plurality of pockets, two of said pockets are in back-to-back relation and said two pockets each open at a side of said apparatus housing.

38. The assembly defined in claim 35 wherein said power packs are plural and identical.

39. The assembly defined in claim 35 including locating and pivot structure means adjacent one end of each said pocket for receiving and retaining a leading end of said battery power pack in position for enabling said battery power pack to be rocked fully into the pocket after partial insertion of said battery power pack into said pocket to bring said projecting prongs into engagement with said internal contacts and to thereby electrically connect said battery power pack to the respective apparatus of said device, and means for releasably latching the inserted battery power pack in the pocket.

40. In a battery-operated device adapted to receive a selected number of battery units for powering the device, in combination, a powered unit having battery-powered apparatus and including a housing mounting such apparatus, said housing having an outwardly opening pocket in which the base is defined by a rectangular base wall member rigid with said housing, said base wall member providing receptacle openings adapted to receive a pair of AC household type prongs and with circuit means to connect such inserted prongs to said apparatus, a rectangular box-shaped battery pack having a housing mounting a battery, rectifier means connected to the battery for recharging the battery, a pair of AC household-type prongs projecting from one side wall of the pack unit housing at a position intermediate the length and width thereof, and a switch mounted within the pack unit housing, said switch having a normal position which acts to connect said rectifier means to said prongs enabling said pack unit to be recharged by insertion of said prongs in an AC household-type receptacle supply and having a second position which said switch is adapted to assume by being engaged whenever said battery unit prongs are inserted into said powered unit housing receptacle openings to connect said battery to said prongs to power said apparatus; actuating means on said housings to move said switch to its said second position when said prongs are fully inserted into said receptacle openings; said powered unit housing including an open-ended formation at one end of said pocket and adapted to receive and partially enclose one end of said pack unit when fully inserted therein, said open-ended formation comprising a ledge portion adapted to support one end of said pack unit when fully inserted and said base wall member providing an inwardly sloping surface within said open-ended formation, said ledge and said sloping surface cooperating to provide means for allowing rocking of said pack unit about said ledge as a final motion in the insertion of said pack unit and as an initial motion in the removal of said pack unit, said sloping surface providing a space for accommodating the end of said pack unit during said rocking, and latching means for securing said pack unit to said housing pocket.

41. In a battery operated device in a group of similar devices each adapted to receive a selected number of battery units for powering the device, in combination, a powered unit having battery-powered apparatus and including a housing mounting such apparatus, said housing having a pocket with an outwardly open side, a rectangular base and peripheral side walls, said base wall being located opposite said open side and rigid with said housing and being greater in area than any of said peripheral side walls, said base wall providing receptacle openings adapted to receive a pair of AC household type prongs and with circuit means to connect such inserted prongs to said apparatus, a rectangular box-shaped battery pack unit having a housing fitting and movable within said powered unit housing pocket side walls towards and from said base wall, said pack unit mounting a battery, rectifier means connected to the battery for recharging the battery, a pair of AC household type prongs projecting from one flat substantially rectangular sidewall of the pack unit housing at a position intermediate the length and width thereof, and a switch mounted within the pack unit housing, said switch having a normal position which acts to connect said battery through said rectifier means to said prongs enabling said pack unit to be recharged by insertion of said prongs in an AC household type receptacle supply and having a second position which said switch is adapted to assume by being engaged whenever said battery unit prongs are inserted into said powered unit housing receptacle openings to connect said battery to said prongs to power said apparatus; actuator means arranged on said units to move said switch to its said second position when said prongs are fully inserted into said powered unit housing receptacle openings; latching means for securing said units when said pack unit is fully inserted into said powered unit housing pocket; and said powered unit housing including an open-ended receptacle formation at one end of said pocket and adapted to receive and partially enclose one end of said pack unit during insertion and when fully inserted therein, said open-ended receptacle comprising a ledge portion adapted to support the outer end inserted surface of said pack unit when fully inserted and said base wall providing an inwardly sloping surface within said open-ended receptacle, said ledge and said sloping surface cooperating to provide means for allowing rocking of said pack unit about said ledge as a final motion in the insertion of said pack unit and as an initial motion in the removal of said pack unit, said sloping surface providing a space for accommodating the end of said pack unit during said rocking.

42. A cooperative cordless device housing and battery pack assembly adapted for use in a device constituting one of a family of portable cordless electrically operated devices wherein each device in the family incorporates electrically operated apparatus in a housing and some of said devices require for operation greater power than that required for others in the family, said assembly comprising:
(a) a housing containing a selected electrically operated apparatus suited to a selected cordless device in said family and having a selected number of pockets each with an outwardly open side for side mounting of a comparable number of power packs corresponding to the power required for the apparatus associated with such device, each of said pockets having a substantially rectangular base wall member opposite the open side thereof and rigid with said housing and forming the bottom wall of said pocket, each said base wall member having a pair of elongated prong receiving openings, internal prong contacts adjacent said openings, said openings and contacts being adapted to receive a pair of contact prongs of the type adapted for insertion into a conventional household electrical outlet, and means for electrically connecting said prong contacts to said apparatus; and
(b) a selected number of rechargeable electric battery power packs comparable in number to the number of said pockets and each being adapted to being removably inserted and mounted in any said pocket of said housing, each said pack comprising:
(i) an elongated pack housing having at least one substantially rectangular side wall and containing electrical battery means, a rectifier and a pair of external prongs projecting rigidly from said side wall, said prongs being adapted for insertion either into a conventional household electrical outlet for charging said pack or into a pair of said pocket base member openings for engaging the respective prong contacts associated therewith for powering said apparatus;
(ii) a circuit within said pack housing comprising a switch having connections to said rectifier and battery means and having an actuator, said switch being spring biased to connect said battery means to said prongs through said rectifier when the pack is not mounted on the device and adapted to being actuated by means on the device to connect the battery means to discharge through the prongs upon mounting the pack in a said pocket, said actuator being accessible through an opening in said wall, said switch being adapted to being actuated by means on the device projecting in said opening and including cooperating mean associated with said apparatus housing and said pack enabling the switch of any such pack when completely inserted into any pocket of said apparatus housing to be actuated to connect the respective battery means thereof to discharge through the respective prongs thereof for powering said apparatus;
(iii) locating and pivot structure means adjacent one end of each said pocket for receiving and retaining a leading end of said battery power pack in position for enabling said battery power pack to be rocked fully into the pocket after partial insertion of said battery power pack into said pocket to bring said projecting prongs into engagement with said internal contacts and to thereby electrically connect said battery power pack to the respective apparatus of said device; and (iv) means for releasably latching the inserted battery power pack in the pocket;

each said power pack and pocket being of a respective substantially uniform mating construction such that the same power pack singly or in multiple may be mounted in any pocket of said housing adapting said assembly to be used in any of the devices of the family incorporating such assembly.

* * * * *

UNITED STATES PATENT OFFICE
CERTIFICATE OF CORRECTION

Patent No. 4,084,123               Dated April 11, 1978

Inventor(s) Lynn D. Lineback and James E. Edgell

It is certified that error appears in the above-identified patent and that said Letters Patent are hereby corrected as shown below:

Col. 1, Line 12, "separare" should be --separate--.

Col. 4, Line 51, insert --fully-- after "pack".

Col. 4, Line 56, after the word "line", "24-25" should be --25-25--.

Col. 9, Line 40, insert --is generally-- after "device".

Col. 13, Line 47, "powdered" should be --powered--.

Col. 17, Line 28, "contact" should be --contacts--.

Col. 18, Line 29, "within" should be --wherein--.

Signed and Sealed this

Third Day of October 1978

[SEAL]

Attest:

RUTH C. MASON
Attesting Officer

DONALD W. BANNER
Commissioner of Patents and Trademarks